US012719216B2

(12) United States Patent
Huang et al.

(10) Patent No.: US 12,719,216 B2
(45) Date of Patent: Aug. 25, 2026

(54) CONNECTOR FOR TRANSMITTING HIGH-SPEED SIGNALS

(71) Applicants: TE Connectivity Solutions GmbH, Schaffhausen (CH); Tyco Electronics (Shanghai) Co., Ltd., Shanghai (CN)

(72) Inventors: Liang (Vincent) Huang, Shanghai (CN); Eric David Briant, Middletown, PA (US)

(73) Assignees: TE Connectivity Solutions GmbH, Schaffhausen (CH); Tyco Electronics (Shanghai) Co., Ltd., Shanghai (CN)

( * ) Notice: Subject to any disclaimer, the term of this patent is extended or adjusted under 35 U.S.C. 154(b) by 378 days.

(21) Appl. No.: 18/318,080

(22) Filed: May 16, 2023

(65) Prior Publication Data

US 2023/0369810 A1 Nov. 16, 2023

(30) Foreign Application Priority Data

May 16, 2022 (CN) ........................ 202210579246.3

(51) Int. Cl.
*H01R 13/6471* (2011.01)
*H01R 12/70* (2011.01)

(52) U.S. Cl.
CPC ....... *H01R 13/6471* (2013.01); *H01R 12/707* (2013.01)

(58) Field of Classification Search
CPC . H01R 12/724; H01R 12/716; H01R 13/6471
USPC ........................................................ 439/825
See application file for complete search history.

(56) References Cited

U.S. PATENT DOCUMENTS 6,309,259 B1 * 10/2001 Yamashita ............. H05K 3/308 439/825
6,394,822 B1 * 5/2002 McNamara ........ H01R 13/6585 439/607.07
6,948,951 B2 * 9/2005 Wu ........................ H01R 12/57 439/607.05
8,894,422 B2 * 11/2014 Yeh ........................ H01R 4/024 439/83
9,825,386 B2 * 11/2017 Lee ........................ H01R 12/73
10,574,002 B1 * 2/2020 Henry .................. H01R 13/405
11,398,693 B2 * 7/2022 Yang ...................... H01R 31/08
11,495,917 B2 * 11/2022 Buck .................... H01R 43/205
11,581,688 B2 * 2/2023 Lin ...................... H01R 12/707
11,621,525 B2 * 4/2023 Lin ...................... H01R 13/502 439/83
11,637,402 B2 * 4/2023 Song .................. H01R 13/6585 439/607.05
12,308,574 B2 * 5/2025 Huang .............. H01R 12/7005
(Continued)

*Primary Examiner* — Marcus E Harcum
(74) *Attorney, Agent, or Firm* — Barley Snyder

(57) ABSTRACT

A connector includes a housing, a plurality of transmission terminals disposed within the housing, and a grounding strip disposed within the housing and arranged on one side of the plurality of transmission terminals. The grounding strip includes a plurality of grounding terminals and a plurality of extensions. The plurality of grounding terminals each extend from at least one end of the grounding strip. The plurality of extensions each extend from the grounding strip and are arranged between two adjacent ones of the plurality of grounding terminals. At least one of the plurality of extensions faces towards corresponding ones of the plurality of transmission terminals.

22 Claims, 4 Drawing Sheets

(56) References Cited

U.S. PATENT DOCUMENTS

| | | | | |
|---|---|---|---|---|
| 2010/0124852 | A1* | 5/2010 | Wang | H01R 24/58 439/660 |
| 2013/0115815 | A1* | 5/2013 | Lim | H01R 13/652 439/607.11 |
| 2015/0162713 | A1* | 6/2015 | Tsai | H01R 12/724 439/676 |
| 2019/0067838 | A1* | 2/2019 | Ju | H01R 13/62938 |
| 2019/0131743 | A1* | 5/2019 | Hsu | H01R 13/405 |
| 2019/0190207 | A1* | 6/2019 | Ju | H01R 12/57 |
| 2019/0221953 | A1* | 7/2019 | Chen | H01R 13/516 |
| 2020/0212631 | A1* | 7/2020 | Buck | H01R 12/73 |
| 2021/0135403 | A1* | 5/2021 | Yang | H01R 13/6471 |
| 2024/0332863 | A1* | 10/2024 | Zhou | H01R 12/716 |
| 2025/0141155 | A1* | 5/2025 | Tsunemura | H01R 13/639 |

* cited by examiner

CONNECTOR FOR TRANSMITTING HIGH-SPEED SIGNALS

CROSS-REFERENCE TO RELATED APPLICATION

This application claims the benefit of Chinese Patent Application No. 202210579246.3 filed on May 16, 2022, in the China National Intellectual Property Administration, the whole disclosure of which is incorporated herein by reference.

FIELD OF THE INVENTION

The present invention relates to a connector, and more specifically to an electrical connector for transmitting high-speed signals.

BACKGROUND

In communication technology, the continuous improvement of data transmission rates (such as 224 Gbps or above) has resulted in similarly increasing requirements for signal integrity (SI) performance of associated data connectors. In order to match impedance and suppress crosstalk within a connector, it is necessary to adjust widths, spacings, and surrounding plastic structures of welding leg ground terminals and transmission terminals of the connector. However, due to requirements of mechanical and processing aspects (such as material aspect ratio, plastic part forming, assembly tolerance, etc.), greater challenges are posed regarding optimizing performance of the welding leg, particularly regarding impedance matching. To date, it has proven difficult to improve overall connector performance using existing connector and/or terminal structures.

Accordingly, it is necessary to provide improved connector and/or terminal structures for optimizing signal integrity performance.

SUMMARY

An electrical connector according to an embodiment of the present disclosure includes a housing, a plurality of transmission terminals disposed within the housing, and a grounding strip disposed within the housing and arranged on one side of the plurality of transmission terminals. The grounding strip includes a plurality of grounding terminals and a plurality of extensions. The plurality of grounding terminals each extend from at least one end of the grounding strip. The plurality of extensions each extend from the grounding strip and are arranged between two adjacent ones of the plurality of grounding terminals. At least one of the plurality of extensions faces towards corresponding ones of the plurality of transmission terminals.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
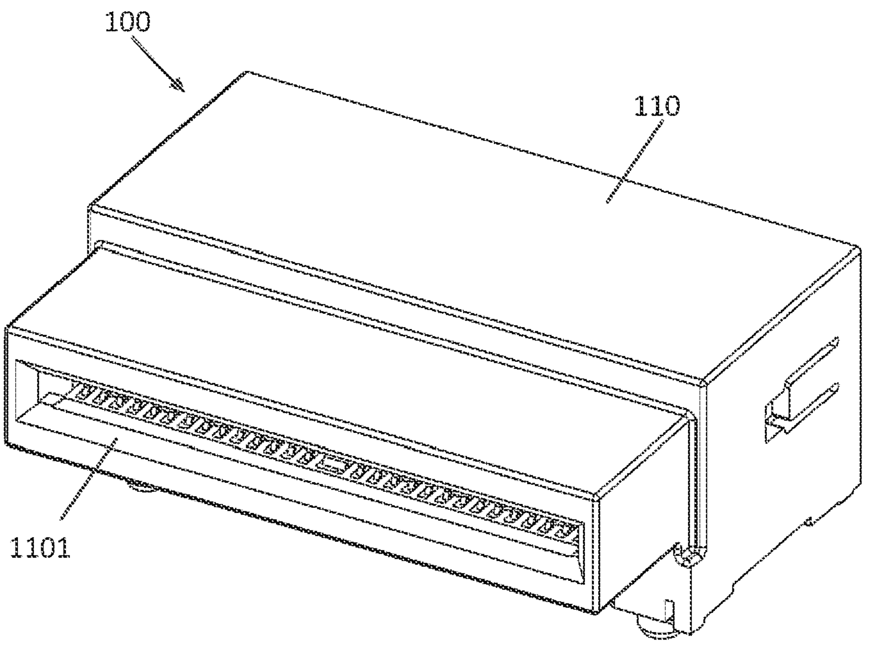
FIG. 1 is a perspective view showing a front end of a connector according to an embodiment of the present disclosure.
Figure 2:
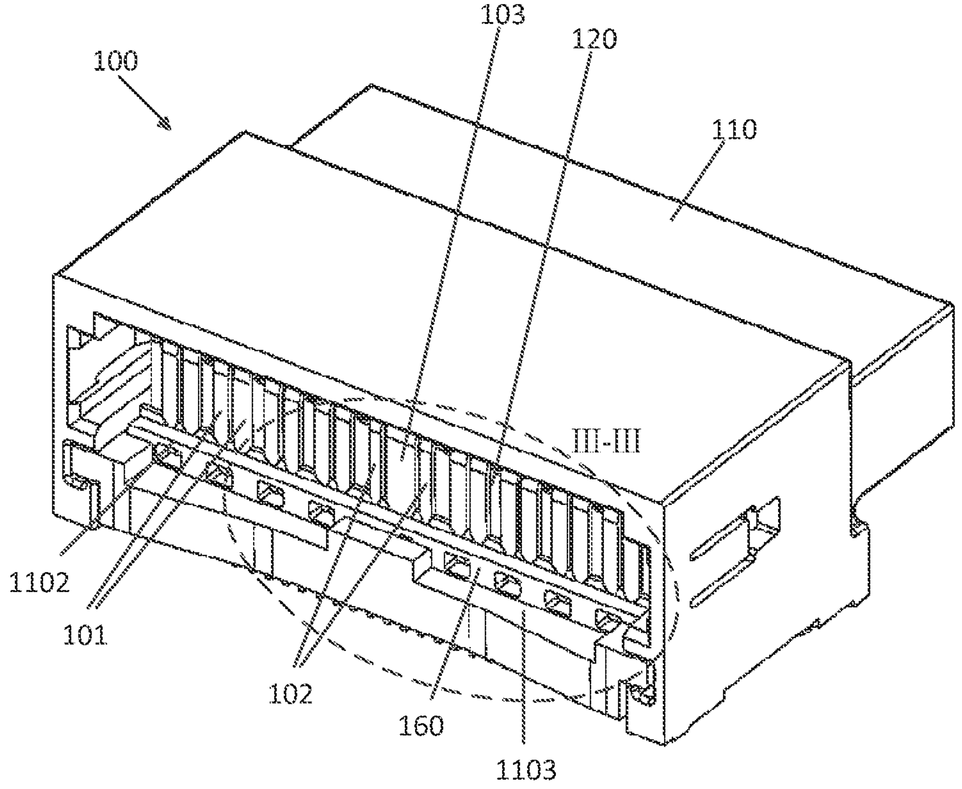
FIG. 2 is a perspective view showing a rear end of the connector in FIG. 1.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring to FIGS. 1-8, a connector 100 capable of transmitting high-speed signals in a device is disclosed, comprising a front end 1101 (see FIG. 1) adapted to accommodate a circuit board 300 inserted therein and a back end 1102 (see FIG. 2) to be soldered to a circuit board 200. The connector 100 further comprises a housing 110 in which a plurality of transmission terminals 101, 102, 103 and two grounding strips 120 are disposed. Each of the grounding strips 120 is arranged on one side of the plurality of transmission terminals 101, 102 and 103 and comprises a plurality of grounding terminals 121, 122 and a plurality of extensions 125, 126. The plurality of grounding terminals 121, 122 extend from at least one of ends 123, 124 of the grounding strip 120, respectively. The plurality of extensions 125, 126 extend from the grounding strip 120 respectively, and more specifically, the plurality of extensions 125, 126 extend from the grounding strip 120 respectively relative to roots 1211, 1221 of the grounding terminals 121, 122 connected to the grounding strip 120, and are respectively arranged between two adjacent grounding terminals 121, 122. At least one of the extensions 125, 126 is arranged to face towards corresponding ones of the transmission terminals 101, 102, and 103. The plurality of transmission terminals 101, 102 and 103 comprise pairs of first transmission terminals 101 configured to transmit high-speed signals in a differential manner.

At least one of the extensions 125, 126 is configured to face towards a respective pair of first transmission terminals 101 so as to provide a reference ground for the respective pair of first transmission terminals 101, so that the first transmission terminals 101 and the extensions 125, 126 together form a microstrip line structure. By adjusting widths of and spacing between two first transmission terminals of at least one pair of the pairs of first transmission terminals 101 in the microstrip line structure, an appropriate impedance may be achieved. Therefore, within a range of mechanical and processing requirements, adjusting a few structural parameters may achieve a larger performance improvement, simplifying a design complexity of the connector 100 and facilitating a performance optimization of the connector 100. Further, due to protrusions of the extensions 125, 126, coupling between signals from different pairs of first transmission terminals 101 is reduced, thereby achieving crosstalk suppression.

The plurality of extensions 125, 126 comprise first extensions 125 respectively extending in a vertical direction D1 from the first end 123 of the grounding strip 120. The longer each of the first extensions 125 is, the stronger the ability of the connector 100 to achieve the crosstalk suppression and appropriate impedance to improve the signal integrity (SI) is. In one embodiment, the first extension 125 may abut against a ground electrode of the circuit board 200 to be welded to the connector 100.

Figure 3:
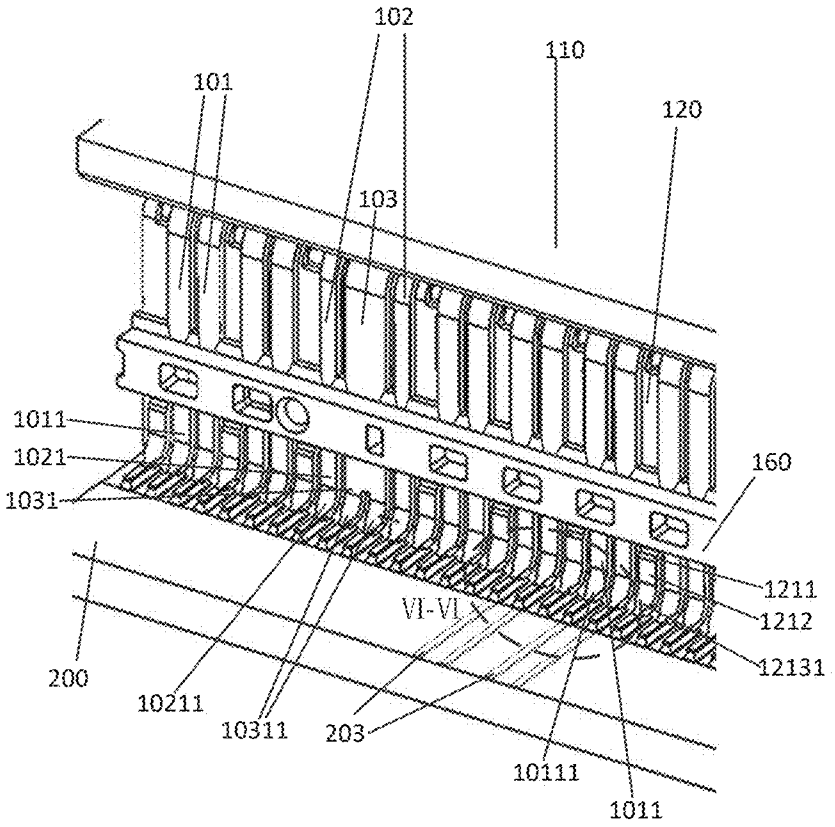
FIG. 3 is an enlarged view of a portion of the connector surrounded by a dashed line III-III in FIG. 2, in which a baffle has been removed and a circuit board has been added.
Figure 4:
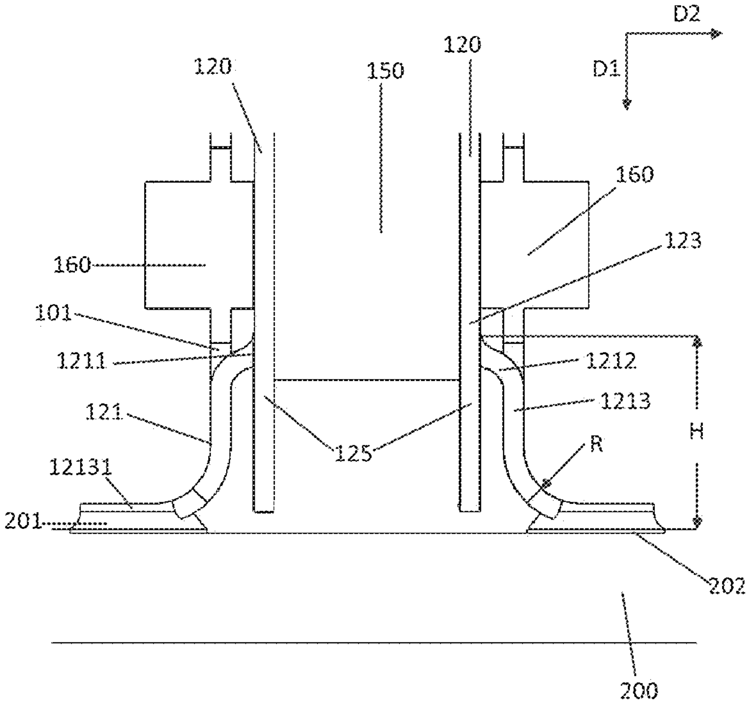
FIG. 4 is a cross-sectional view of the portion of the connector shown in FIG. 3, showing first grounding terminals respectively located on either side of a connecting piece.
Figure 5:
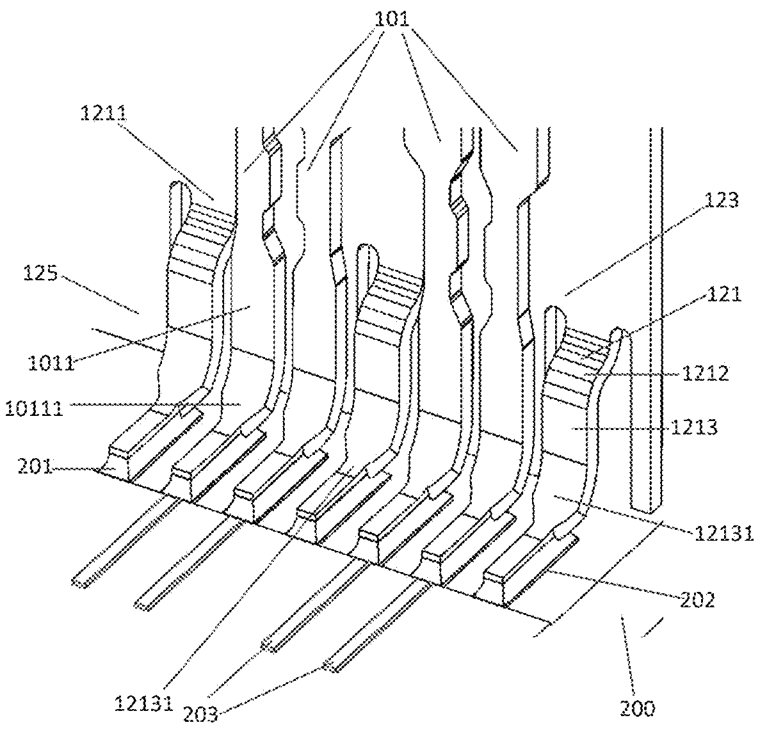
FIG. 5 is an enlarged view of a portion of the connector enclosed by a dashed line VI-VI in FIG. 3.

Referring to FIGS. 3-5 (in FIG. 3, a baffle 1103 in FIG. 2 used to protect the corresponding transmission terminals and grounding terminals at the back end 1102 has been removed for clarity), the plurality of grounding terminals comprise first grounding terminals 121 respectively extending from the first end 123 of the grounding strip 120, and each of the first grounding terminals 121 has a root 1211 connected to the grounding strip 120 and having a height H greater than 1.0 mm relative to the circuit board 200, ensuring that the first extension 125 has a sufficient length to achieve improved signal integrity performance of the connector 100.

Referring to FIG. 4, each of the first grounding terminals 121 comprises a first extending arm 1212 and a first connecting arm 1213. The first extending arm 1212 extends obliquely from the first end 123 of the grounding strip 120, and the first connecting arm 1213 extends from the first extending arm 1212 in a vertical direction D1 and parallel to the first end 123 of the grounding strip 120. The first connecting arm 1213 has a first free end 12131 that is bent 90 degrees from the vertical direction D1 towards a horizontal direction D2, and the first free end 12131 has a width or thickness gradually decreasing along a path or direction bending 90 degrees from the vertical direction D1 towards the horizontal direction D2, such that the first free end is allowed to be welded onto a solder pad 202 of the circuit board 200 through a solder 201. The first free end 12131 has a curvature radius R greater than 0.4 mm.

The first end 1011 of each of the first transmission terminals 101 has a first transmission free end 10111 constructed to be the same as and aligned with the first free end 12131. Specifically, a width or thickness of the first transmission free end 10111 gradually decreases along the path or direction bending 90 degrees from the vertical direction D1 towards the horizontal direction D2, so that the first transmission free end 10111 may be welded to a corresponding solder pad of the circuit board 200 through a solder 201 (see FIGS. 3 and 5, where a corresponding signal line 203 is led out from the corresponding solder pad). The first transmission free end 10111 has a curvature radius R greater than 0.4 mm.

Compared to conventional structures, the curvature radius of the first transmission free end 10111 increases (i.e., R is greater than 0.4 mm). With a slow bending, a gradual change in the width or thickness of the first transmission terminal 101 is achieved, resulting in a section of the first transmission terminal where its width or thickness varies being longer, thereby optimizing the signal integrity performance and reducing a negative impact of the width change of the first transmission terminal 101 on the signal integrity performance during the bending process.

Still referring to FIG. 4, the connector 100 further comprises a connecting piece 150, two first fixing pieces 160 and two second fixing pieces 170, wherein two grounding strips 120 are respectively arranged on opposite sides of the connecting piece 150. Each of the first fixing pieces 160 is arranged on respective one of the grounding strips 120 near the first end 123 of the respective grounding strip 120 so as to fix the plurality of transmission terminals 101, 102, 103 such that the plurality of transmission terminals are spaced apart from the respective grounding strip 120. Each of the second fixing pieces 170 is arranged on respective one of the grounding strips 120 near the second end 124 of the respective grounding strip 120 opposite to the first end 123 (i.e., the first end 123 and the second end 124 of the grounding strip 120 are two opposite ends of the grounding strip 120) so as to fix the plurality of transmission terminals 101, 102, 103 such that the plurality of transmission terminals are spaced apart from the respective grounding strip 120.

Figure 6:
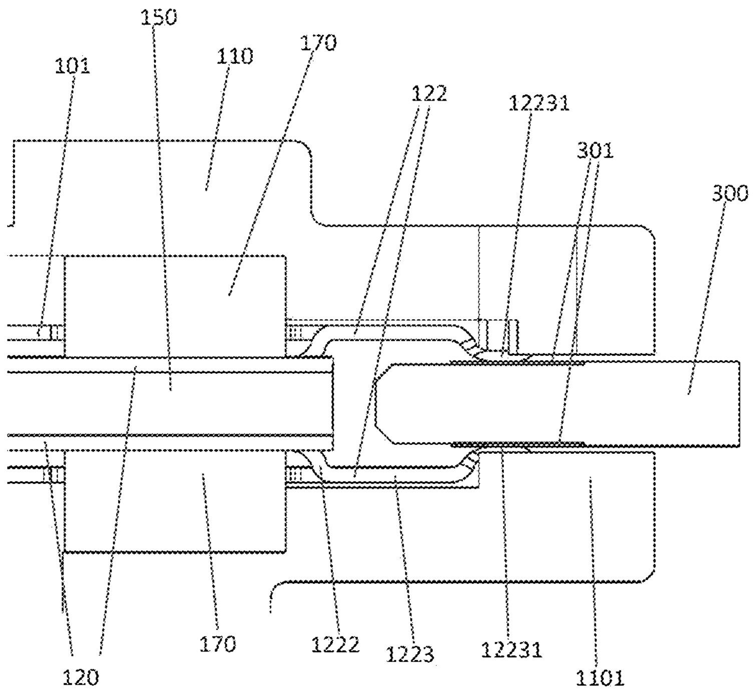
FIG. 6 is a cross-sectional view of the front end of the connector in FIG. 1, showing an internal structure of the front end of the connector.
Figure 7:
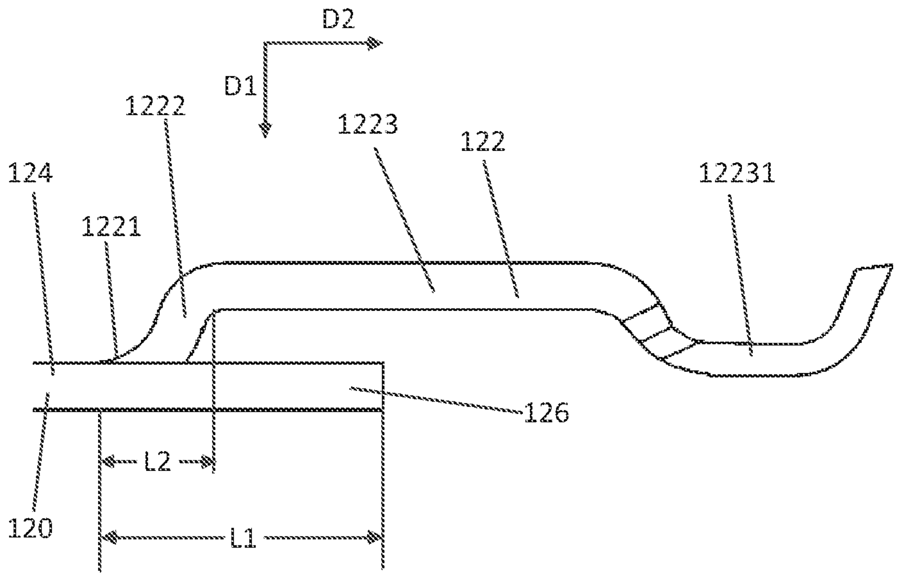
FIG. 7 is an enlarged view separately showing a second extension and a second grounding terminal shown in FIG. 6.
Figure 8:
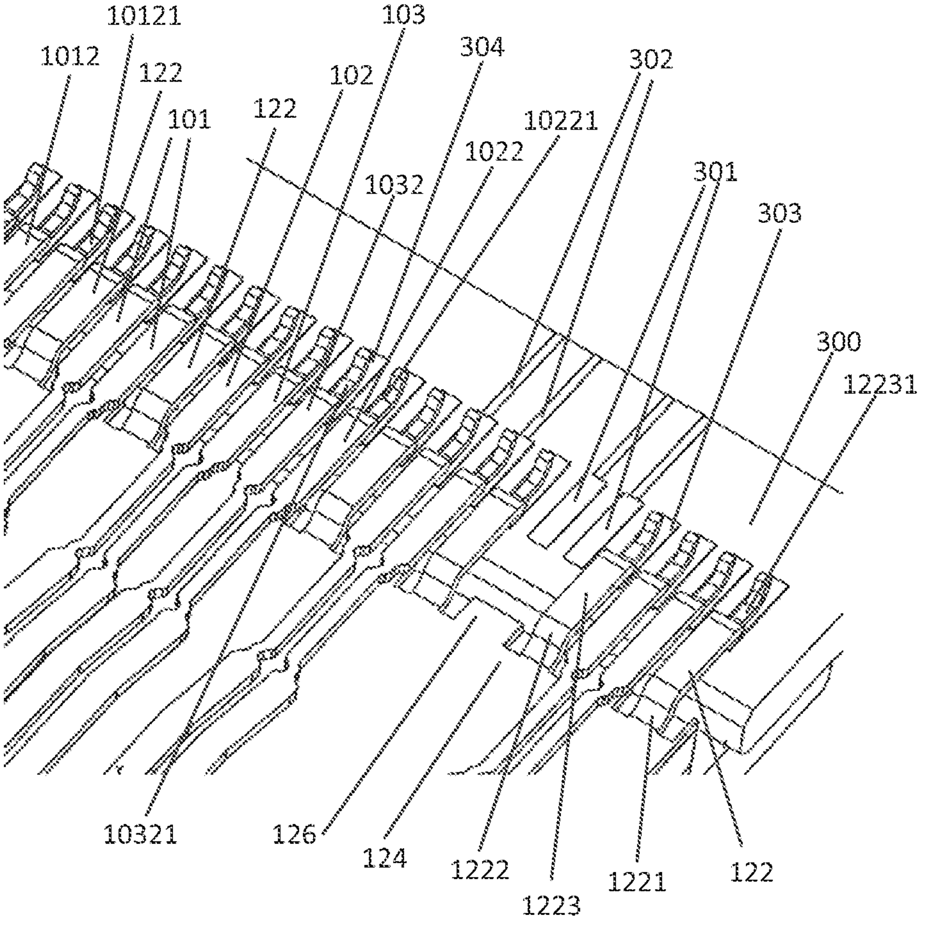
FIG. 8 is a top view showing the front end of the connector in FIG. 1, with a housing removed.

Referring to FIGS. 6-8, the plurality of extensions further comprise second extensions 126, each of which extends in the horizontal direction D2 from the second end 124 of the grounding strip 120 positioned opposite to the first end (see FIG. 8, in order to show the second extension 126, a pair of first transmission terminals 101 are removed). In this embodiment, the grounding strip 120 is constructed as a “L” shape, with the first end 123 located on a vertically extending leg of the “L” shape and the second end 124 located on a horizontally extending leg of the “L” shape. However, those skilled in the art should understand that the present disclosure is not limited to this, and the grounding strip 120 may be constructed as any suitable shape as needed. The plurality of grounding terminals further comprise second grounding terminals 122 respectively extending from the second end 124 of the grounding strip 120. Each of the second grounding terminals 122 comprises a second extending arm 1222 and a second connecting arm 1223. The second extending arm 1222 extends obliquely from the second end 124 of the grounding strip 120. The second connecting arm 1223 extends from the second extending arm 1222 in the horizontal direction D2 and parallel to the second end 124 of the grounding strip 120. The second extension 126 has a length L1 greater than a length L2 of a projection of the second extending arm 1222 on a plane where the second end 124 of the grounding strip 120 is located, in order to achieve a good performance of the second extension 126 in improving the signal integrity. The second connecting arm 1223 has a second free end 12231 bent as a “U” shape to facilitate abutting against a ground electrode 303 of the circuit board 300 inserted into the connector 100.

The first ends 1011 of two adjacent pairs of first transmission terminals 101 are spaced apart from each other with respective one of the first grounding terminals 121 located therebetween (see FIGS. 3 and 5), and the second ends 1012 of the two adjacent pairs of first transmission terminals 101 are spaced apart from each other with respective one of the second grounding terminals 122 located therebetween (see FIG. 8).

The plurality of transmission terminals further comprise second transmission terminals 102 and third transmission terminals 103. Each of the second transmission terminals 102 is configured to transmit a low-speed signal. Each of the third transmission terminals 103 is configured to transmit a power signal and the third transmission terminals 103 are located between two of the second transmission terminals 102 (see FIGS. 3 and 5). A first end 1021 of each of the two second transmission terminals 102 is spaced apart from the first ends 1011 of the adjacent pair of first transmission terminals 101 with another of the first grounding terminals 121 located therebetween, and the second end 1022 of each of the two second transmission terminals 102 is spaced apart from the second ends 1012 of the adjacent pair of first transmission terminals 101 with another of the second grounding terminals 122 located therebetween (see FIGS. 3, 5 and 8).

Similar to the first transmission terminals 101, the first ends 1021, 1031 of the transmission terminals 102, 103 have first transmission free ends 10211, 10311 constructed to be the same as and aligned with the first free end 12131, respectively (i.e., the first end of each of the first transmission terminals, the second transmission terminals and the third transmission terminal has a first transmission free end constructed to be the same as and aligned with the first free end), to facilitate welding of the transmission terminals 102, 103 to the corresponding solder pads of the circuit board 200 through the solder 201.

The second ends 1012, 1022 and 1032 of the transmission terminals 101, 102 and 103 have second transmission free ends 10121, 10221 and 10321 constructed to be the same as and aligned with the second free end 12231, respectively (i.e, the second end of each of the first transmission terminals, the second transmission terminals and the third transmission terminal has a second transmission free end constructed to be the same as and aligned with the second free end). For example, the second transmission free ends 10121, 10221 and 10321 are all bent into the same "U" shape as the second free end 12231, so as to abut against the corresponding electrodes 301, 302 and 304 of the circuit board 300 inserted into the connector 100 (see FIG. 8).

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector comprising:

a housing;

a plurality of transmission terminals disposed within the housing; and a grounding strip disposed within the housing and arranged on one side of the plurality of transmission terminals, and comprising:

a plurality of grounding terminals each extending from at least one end of the grounding strip and including first grounding terminals, each first grounding terminal includes a first extending arm extending from a first end of the grounding strip and a first connecting arm extending from the first extending arm, the first connecting arm has a first free end bent from a vertical direction towards a horizontal direction, the first free end having a width gradually decreasing along a path bent 90 degrees from the vertical direction towards the horizontal direction; and a plurality of extensions each extending from the grounding strip and arranged between two adjacent ones of the plurality of grounding terminals, at least one of the plurality of extensions faces towards corresponding ones of the plurality of transmission terminals.

2. The connector according to claim 1, wherein the plurality of extensions include first extensions, each extending vertically from the first end of the grounding strip and adapted to abut against a circuit board to be welded to the connector.

3. The connector according to claim 2, wherein the first grounding terminals extend from the first end of the grounding strip, each of the first grounding terminals having a root connected to the grounding strip and a height greater than 1.0 mm relative to the circuit board.

4. The connector according to claim 3, wherein, the first extending arm extends obliquely from the first end of the grounding strip, and the first connecting arm extends from the first extending arm in the vertical direction and parallel to the first end of the grounding strip.

5. The connector according to claim 4, wherein, the first free end is bent 90 degrees from the vertical direction towards the horizontal direction, the first free end is weldable onto the circuit board.

6. The connector according to claim 5, wherein the first free end has a radius or curvature greater than 0.4 mm.

7. The connector according to claim 5, wherein the extensions further includes second extensions each extending horizontally from a second end of the grounding strip positioned opposite to the first end.

8. The connector according to claim 7, wherein the plurality of grounding terminals further includes second grounding terminals extending from the second end of the grounding strip.

9. The connector according to claim 8, wherein each of the second grounding terminals includes:

a second extending arm extending obliquely from the second end of the grounding strip; and a second connecting arm extending from the second extending arm in the horizontal direction and parallel to the second end of the grounding strip.

10. The connector according to claim 9, wherein each of the second extensions has a length greater than a length of a projection of the second extending arm on a plane in which the second end of the grounding strip is located.

11. The connector according to claim 10, wherein, each of the second connecting arms has a second free end defining a U-shape.

12. The connector according to claim 11, wherein the plurality of transmission terminals include pairs of first transmission terminals, each pair of first transmission terminals adapted to transmit high-speed signals in a differential manner, first ends of two adjacent pairs of first transmission terminals being spaced apart from each other with respective one of the first grounding terminals located therebetween, second ends of the two adjacent pairs of first transmission terminals being spaced apart from each other with one of the second grounding terminals located therebetween.

13. The connector according to claim 12, wherein the plurality of transmission terminals further comprise:

two second transmission terminals each configured to transmitting a low-speed signal; and a third transmission terminal configured to transmit a power signal and located between the two second transmission terminals, a first end of each of the two second transmission terminals is spaced apart from first ends of the adjacent pair of first transmission terminals with another of the first grounding terminals located therebetween, and a second end of each of the two second transmission terminals is spaced apart from second ends of the adjacent pair of first transmission terminals with another of the second grounding terminals located therebetween.

14. The connector according to claim 13, wherein a first end of each of the first transmission terminals, the second transmission terminals and the third transmission terminal has a first transmission free end constructed to be the same as and aligned with the first free end.

15. The connector according to claim 14, wherein a second end of each of the first transmission terminals, the second transmission terminals and the third transmission terminal has a second transmission free end constructed to be the same as and aligned with the second free end.

16. The connector according to claim 1, further comprising a connecting piece, two said grounding strips are arranged on opposite sides of the connecting piece respectively.

17. The connector according to claim 16, further comprising two first fixing pieces, each first fixing piece arranged on a respective one of the grounding strips proximate the first end of the respective grounding strip and fixing the plurality of transmission terminals such that the plurality of transmission terminals are spaced apart from the respective grounding strip.

18. The connector according to claim 17, further comprising two second fixing pieces, each second fixing piece arranged on a respective one of the grounding strips proximate the second end of the respective grounding strip and fixing the plurality of transmission terminals such that the plurality of transmission terminals are spaced apart from the respective grounding strip.

19. A connector assembly comprising:

a circuit board; and a connector including:

a housing, a plurality of transmission terminals arranged within the housing and welded to the circuit board; and a grounding strip arranged within the housing on one side of the plurality of transmission terminals, including:

a plurality of grounding terminals each extending from at least one end of the grounding strip, the plurality of grounding terminals including first grounding terminals extending from a first end of the grounding strip and welded to the circuit board, each first grounding terminal includes a first extending arm extending from the first end of the grounding strip and a first connecting arm extending from the first extending arm, the first connecting arm has a first free end bent from a vertical direction towards a horizontal direction, the first free end having a width gradually decreasing along a path bent 90 degrees from the vertical direction towards the horizontal direction; and a plurality of extensions each extending from the grounding strip and positioned between two adjacent ones of the plurality of grounding terminals, the plurality of extensions including first extensions extending from the first end of the grounding strip.

20. The connector assembly according to claim 19, wherein the plurality of transmission terminals comprise pairs of first transmission terminals, each pair of the first transmission terminals being configured to transmit high-speed signals in a differential manner, first ends of two adjacent pairs of the first transmission terminals being spaced apart from each other with respective one of the first grounding terminals located therebetween, second ends of the two adjacent pairs of the first transmission terminals being spaced apart from each other with one of a plurality of second grounding terminal of the plurality of grounding terminals located therebetween.

21. A connector comprising:

a housing;

a plurality of transmission terminals disposed within the housing; and a grounding strip disposed within the housing and arranged on one side of the plurality of transmission terminals, and comprising:

a plurality of grounding terminals each extending from at least one end of the grounding strip and including first grounding terminals and second grounding terminals, each first grounding terminal includes a first extending arm extending from a first end of the grounding strip and a first connecting arm extending from the first extending arm, the first connecting arm has a first free end bent from a vertical direction towards a horizontal direction, each second grounding terminal includes a second extending arm extending from a second end of the grounding strip, and a second connecting arm extending from the second extending arm in the horizontal direction and parallel to the second end of the grounding strip; and a plurality of extensions each extending from the grounding strip and arranged between two adjacent ones of the plurality of grounding terminals, at least one of the plurality of extensions faces towards corresponding ones of the plurality of transmission terminals.

22. The connector according to claim 21, wherein, each of the second connecting arms has a second free end defining a U-shape.

* * * * *